United States Patent [19]

Cecchini

[11] Patent Number: 5,150,244
[45] Date of Patent: Sep. 22, 1992

[54] FIBER OPTIC INTERFACE

[75] Inventor: Warren Cecchini, Penn Hills, Pa.

[73] Assignee: American Auto-Matrix, Inc., Export, Pa.

[21] Appl. No.: 535,389

[22] Filed: Jun. 8, 1990
(Under 37 CFR 1.47)

[51] Int. Cl.⁵ ............................................. H04B 10/24
[52] U.S. Cl. ...................................... 359/113; 359/154
[58] Field of Search ............... 455/617, 612, 606, 607, 455/601; 370/29; 359/113, 154, 157, 164, 173

[56] References Cited

U.S. PATENT DOCUMENTS

| | | | |
|---|---|---|---|
| 4,399,563 | 8/1983 | Greenberg | 455/607 |
| 4,573,215 | 2/1986 | Oates et al. | 455/607 |
| 4,630,256 | 12/1986 | Albanese | 455/612 |
| 4,641,373 | 2/1987 | Shutterly | 455/607 |
| 4,654,844 | 3/1987 | Mandello | 455/607 |
| 4,850,042 | 7/1989 | Petronio et al. | 455/601 |

*Primary Examiner*—Edward L. Coles, Sr.
*Assistant Examiner*—Kinfe-Michael Negash
*Attorney, Agent, or Firm*—Ansel M. Schwartz

[57] ABSTRACT

An apparatus for optically connecting at least two independent half-duplex networks. The apparatus receives electrical signals from a first network, converts these signals to optical signals, and then transmits the optical signals along optical fiber to another apparatus. This apparatus converts the optical signals it receives to electrical signals and transmits the signals to the second network. The apparatus controls the flow signals to and from the networks and optical fibers without any external control signals.

3 Claims, 4 Drawing Sheets

FIBER OPTIC INTERFACE

FIELD OF THE INVENTION

The present invention is related to communications equipment. More specifically, the present invention is related to an apparatus that allows independent half-duplex networks to be connected by optical fiber.

BACKGROUND OF THE INVENTION

As computers have become more sophisticated, networks have developed which allows individual computers to communicate with each other. Protocols must be followed in order for these to be any sense made of information passing along the network by the computers therein.

The proliferation of half-duplex networks such as 2 wire RS-485 and RS-422 networks suggests the need for networks to be able to effectively communicate with each other. At the least, the same concerns exist with respect to protocol when networks communicate with one another as when computers on a given network communicate with one another. (When two or more networks are connected, it essentially becomes one larger network with each computer having to effectively communicate with the other computers).

When these networks are miles apart, such as the network of one University in a first location and the network of another University in a second location, to drive the well identified advantages of optical fiber providing the connections therebetween becomes desirable. U.S. Pat. No. 4,850,042 to Petronio et al. is one example of an apparatus that converts electrical signals to optical signals and vise versa in order to connect two or more networks. The present invention is another example of such an apparatus which requires no external control of the apparatus.

SUMMARY OF THE INVENTION

The present invention is an apparatus comprised of a first optical receiver for receiving optical digital signals from a first optical fiber. The apparatus is also comprised of a second optical receiver for receiving an optical digital signal from a second optical fiber. There is an interface which is in communication with the first and second optical receivers and a half duplex line for receiving electrical digital signals from the half duplex line and sending electrical digital signals thereto corresponding to optical digital signals received from either the first or second optical receivers. Additionally, the apparatus is comprised of a first optical transmitter means and a second optical transmitter means for providing optical digital signals to a third optical fiber and a fourth optical fiber, respectively, correspondinq to digital signals received from the first or second optical receivers or the electrical interface. There is a first trigger circuit connected between the electrical interface and the first and second optical transmitters for passing signals from the interface to the transmitters when the first trigger circuit is in a first state. Also, there is a receiver data merger connected to the first and second optical receivers for merging the signals therefrom and producing a corresponding signal. Furthermore, there is a second trigger circuit connected between the receiver data merger, and the electrical interface, and the first and second optical transmitters for passing signals from the receive data merger to the interface and the first and second optical transmitters when the second trigger circuit is in a first state. Moreover, there is means for controlling when the first and second trigger circuits are in the first state. The controlling means prevents the first and second trigger circuits from both being in the first state at the same time and from preventing the other trigger circuit from being in the first state for a predetermined period of time corresponding to a number of bits after the other trigger circuit is in the first state.

Depending on which input (the optical receivers or electrical interface) receives a signal first causes the trigger circuit to which it is connected to continue to receive that signal and lock out any signals received by the apparatus through any other inputs. The signal that is first received is allowed to continue to be received for a predetermined period after it is finished before the apparatus can once again receive signals from the other inputs.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
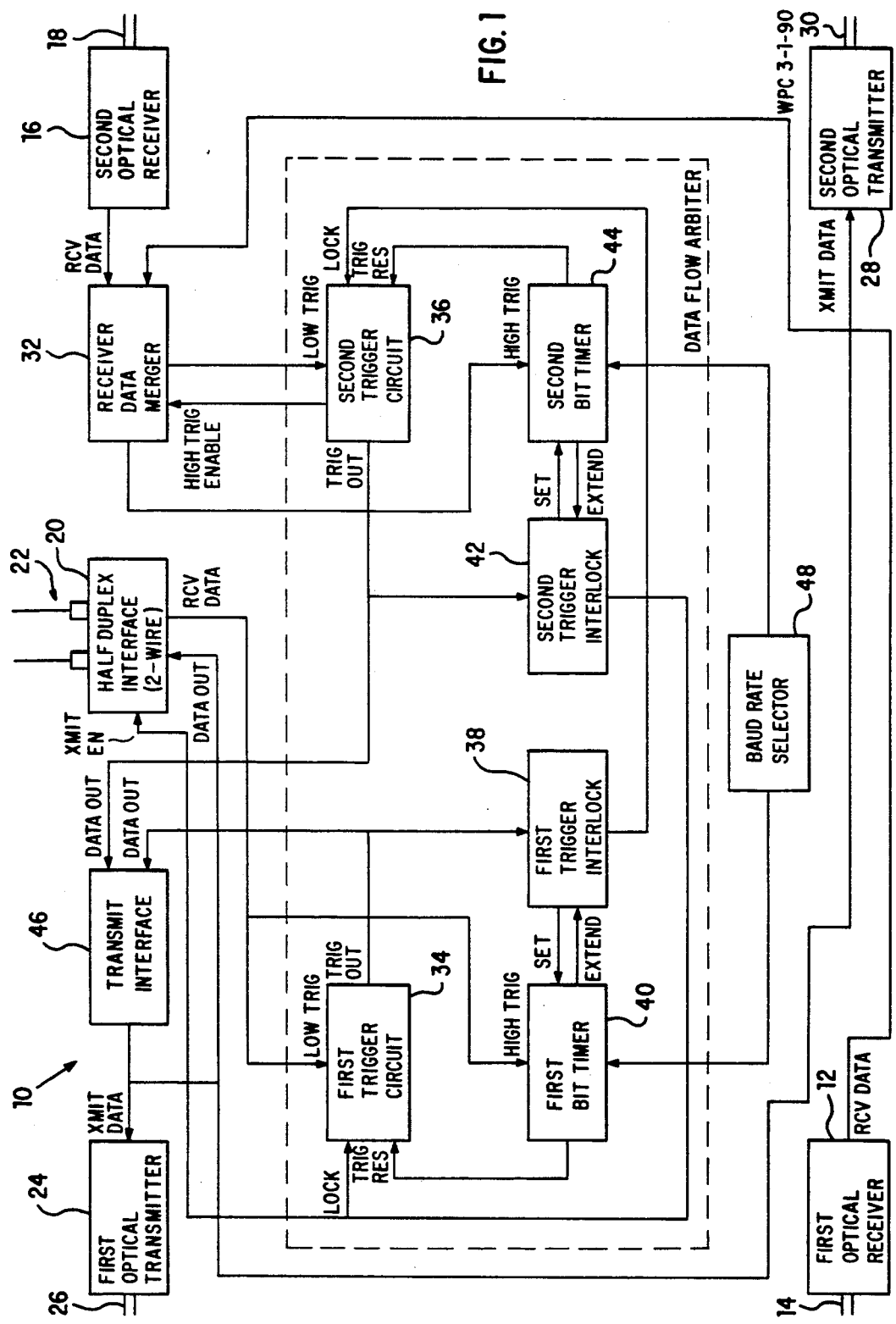
FIG. 1 is a block diagram of the apparatus of the present invention.

Referring now to the drawings wherein like reference numerals refer to similar or identical parts throughout the several views, and more specifically to FIG. 1 thereof, there is shown a block diagram of an apparatus 10 of the present invention. The apparatus 10 comprises a first optical receiver 12 for receiving optical digital signals from a first optical fiber 14. The apparatus is also comprised of a second optical receiver 16 for receiving optical digital signals from a second optical optical 18. In the first optical receiver 12 and the second fiber receiver 16, incoming fiber optic signals on the respective fibers are converted to a corresponding electrical signal.

The apparatus 10 is also comprised of an interface 20 which is in communication with to the first and second optical receivers 12, 16 and to the half duplex line 22 for receiving electrical digital signals from the half duplex line 22 and sending electrical digital signals thereto corresponding to optical digital signals received from either the first or second optical receivers 12, 16. Preferably, interface 20 connected to a half duplex line 22 which is an RS-485 network.

The apparatus 10 is also comprised of a first optical transmitter means 24 for providing optical digital signals to a third optical optical 26 corresponding to digital signals received from the first or second fiber receivers 12, 16 or the interface 20. Additionally, there is a second optical transmitter means 28 for providing optical digital signals to a fourth optical fiber 30 corresponding to signals received from the first or second optical receivers 12, 16 or the interface 20. In the first and second optical transmitter means 24, 28 outgoing electrical signals are converted to optical signals.

There is a optical receive data merger 32 connected to the first and second optical receivers 12, 16 for merging the signals therefrom and producing a corresponding signal.

The apparatus 10 is also comprised of a first trigger circuit 34 in communication with to the interface 20 and the first and second optical transmitters 24, 28 for passing signals from the interface 20 to the first and second optical transmitters 24, 28 and the interface 20 when the first trigger circuit 34 is in a first state. There is also a second trigger circuit 36 in communication with to the receiver data merger 32 and the interface 20, and the first and second optical transmitters 24, 28 for passing signals from the receiver data merger 32 to the interface 20 and the first and second optical transmitters 24, 28 when the second trigger circuit 36 is in a first state.

There is also means for controlling when the first and second trigger circuits 34, 36 are in the first state. The controlling means prevents the first and second trigger circuits 34, 36 from both being in the first state at the same time and prevents one of the trigger circuits from being in the first state for the predetermined period of time corresponding to a number of bits after the other trigger circuit is in the first state.

Preferably, the controlling means includes a first trigger interlock 38 connected to the first and second trigger circuits 34, 36 for locking out the second trigger circuit 36 while the first trigger circuit 34 is in the first state and for the predetermined period of time after the first trigger circuit is in a second state. The controlling means also preferably includes a first bit timer 40 connected to the first trigger interlock 38 for providing a signal to the first trigger interlock 38 causing the first trigger interlock 38 to unlock the second trigger circuit 36 when the predetermined period of time has passed after the first trigger circuit is in a second state. Preferably, the predetermined period of time corresponds to essentially, but less than, the period of time for one data bit for a given baud rate.

Additionally, there is preferably included in the controlling means a second trigger interlock 42 connected to the first and second trigger circuits 34, 36 for locking out the first trigger circuit 34 from the first state while the second trigger circuit 36 is in the first state and for the predetermined period of time after the second trigger circuit is in the second state. Additionally, there is a second bit timer 44 connected to the second trigger interlock 42 for providing a signal to the second trigger interlock 42 causing the second trigger interlock 42 to unlock the first trigger circuit 34 when the predetermined period of time has passed after the second trigger circuit is in the second state.

In the operation of the apparatus 10, an electrical signal travels along the half duplex RS-485 network 22 and is received by the interface 20. The electrical signal is then passed to the first trigger circuit 34 and the bit timer 40. A low signal received by the first trigger circuit 34 causes the first trigger circuit to pass a signal to the first trigger interlock 38 and to a transmit interface 46. When the first trigger interlock 38 receives a signal from a first trigger circuit, it sets the first bit timer 40 to receive a high trigger signal and consequently produce a signal when a high signal is received by it, as is further discussed below.

The first trigger interlock 38 also sends a signal to the second trigger circuit 36 causing the second trigger circuit 36 to be locked out of a first state and thus not able to receive any signals from the receiver data merger 32 and transmit them. As long as low signals are continually received by the first trigger circuit from the interface 20, they will be continually transmitted to the transmit interface 46 without being interrupted by any other signals coming in from any other inputs to the apparatus 10.

The transmit interface 46 provides the signals to the first optical transmitter 24 which produces optical signals corresponding to the electrical signals received by the interface 20 onto the first optical fiber 26. Signals from the transmit interface also are provided to the second optical transmitter 28 where they are transmitted as optical signals to the fourth optical fiber 30. Additionally, signals from the transmit interface 46 are also provided to the interface 20 where they are transmitted back to the interface 20, reaching the RS-485 half duplex network 22 only when the signal has originated at a optical receiver 12 or 16.

When a high signal is then received from the RS-485 network 22 by the interface 20, the first bit timer 40 is caused to produce an extend signal to the first trigger interlock which causes the first trigger interlock to maintain the second trigger circuit locked out of the first state for a period of time corresponding to the length of time of one data bit. If a low signal is subsequently received after the second trigger circuit 36 is locked out of the first state for the additional period of time essentially equivalent to one data bit, then the first trigger circuit 34 continues to receive signals from the interface 20 and transmit them from the apparatus 10 to its outputs as described above. If a low signal is not received by the first trigger circuit 34 from the interface 20 after the additional period of time corresponding to one bit, then the apparatus 10 is free to receive signals from any of its inputs.

If, for instance, another low signal is received first from the interface 20 and provided to the first trigger circuit 34, then as described above, signals from the second optical receiver 16 and first optical receiver 12 are prevented from being transmitted by the apparatus 10. However, if an optical signal is received by the second optical receiver 16 and converted to an electrical signal it is received by the data merger 32 which then provides the signal to the second trigger circuit 36 and the second bit timer 44. If the signal provided the second trigger circuit is a low signal, then the second trigger circuit 36 provides a signal to the second trigger interlock 42 and the transmit interface 46. The signal received by the second trigger interlock 42 causes the first trigger circuit 34 to be locked out of the first state so that no signals can be transmitted by the apparatus 10 that is received by the interface 20.

Initially, the transmitter interface 40 receives a signal from the second trigger circuit 36 and transmits it to the three outputs, as described above. When a high signal is received by the second bit timer 44, the second bit timer provides an extend signal to the second trigger interlock 42 causing the second trigger interlock 42 to maintain the first trigger circuit 34 locked out of the first state for a period of time essentially equal to one bit. This maintains the transmitters in the off or high state for a period of time equivalent to one bit. During this time, neither trigger circuit can be caused to enter the first state. After this bit period of time has passed, the first signal to be received by any given input of the apparatus 10 then commands the apparatus 10 as described above.

Figure 2:
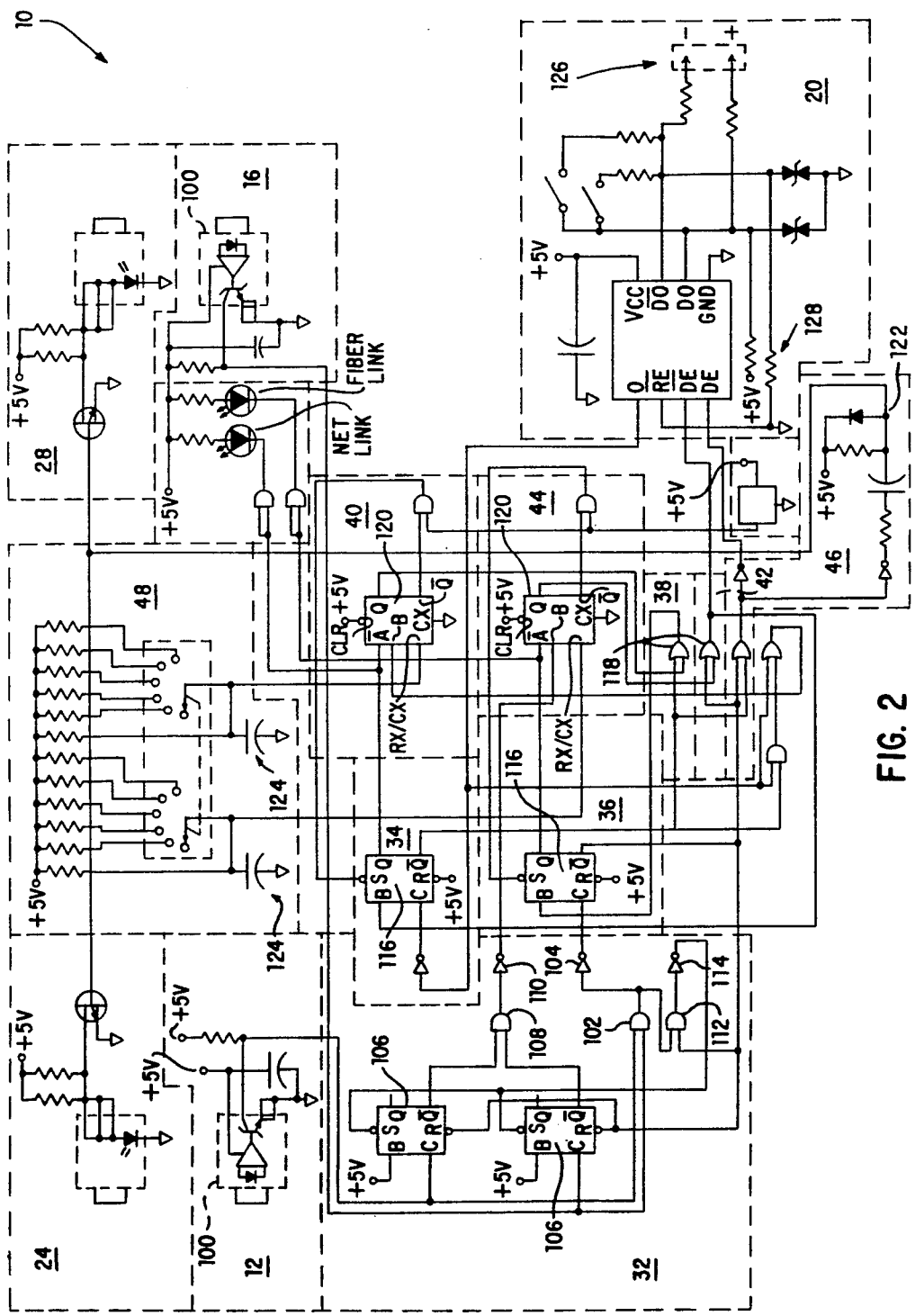
FIG. 2 is a schematic representation of a preferred embodiment of the present invention.

In a preferred embodiment, and as shown in FIG. 2 which is a schematic representation of an apparatus 10, the first optical receiver 12 receives incoming fiber optic signals from the first optical fiber 14 and converts the signals to a TTL level electrical signal. This electrical signal is then fed to the receiver data merger 32. The second optical receiver 16 also receives incoming fiber optic signals from the second optical fiber 18 and converts the signals to a TTL level electrical signal. This electrical signal is then fed to the receiver data merger 32. The first and second optical receivers 12, 16 include Hewlett Packard HFBR-2404 fiber receivers 100.

The receiver data merger 32 receives electrical signals from the fiber receivers 12, 16 and ands them together with and gate 102. The anded result is then inverted by inverter 104 so that any low signal is converted to a high output signal. This output signal is then fed to the trigger circuit 36. The data merger 32 also has a component which produces a high output when an input signal to the apparatus 10 returns to a high signal. The two RS flip-flops 106 of the type LS 74 are held in the reset condition until the trigger circuits 36 has been clocked by a low signal entering the optical receive data merger 32. The /Q outputs of the flip-flops 106 are anded by and gate 108 and then inverted by inverter 110. The inverted signal is fed to the second bit timer 44 high trigger. And gate 112 plus inverter 144 act as a mechanism which sends a trigger to the second bit timer 44 in the event that the corresponding trigger output circuit is in a false condition.

Each trigger circuit 34, 36 is an RS flip-flop 116 of the type LS74 which is ready to be clocked to deliver a low output signal on its Q output provided its D input signal is low (a lock signal) and the S input is high (a reset signal). If these conditions are met, the incoming signal from the receiver data merger 32 to trigger circuit 36 causes a low signal to be output to the bit timer 44, and a high to the trigger interlock 42. The low signal from the /Q output of each flip-flop 116 is also fed to the transmit interface 46. Input from the interface 20 is received by RS flip-flop 110 of the first trigger circuit 34.

Each trigger interlock 38, 42, which is essentially an or gate 118, passes a signal from the respective trigger circuit 34, 36 onto the respective bit time 40, 44 to enable it for a highgoing trigger which will come from the receiver data merger 32, or the interface 20. It also sends a high output signal (lock) to the input of the flip-flop 116 of the first trigger circuit 34 or the second trigger circuit 36. The signal is also presented to the DE input (driver enable) input of the RS-485 interface 20. This turns on the RS-485 interface.

Each bit timer 40, 44 is a one shot multivibrator 120 of the type LS123 which is triggered by a high signal coming from the fiber receive data merger 32, or the interface 20. It must be enabled by a low signal from the respective trigger interlock 38, 42. An output signal from the respective bit timer 40, 44 extends the lock signal to the D input of the flip-flop 116 of the respective trigger circuit 34, 36. The duration of this lock signal is determined by the baud rate selector 48. A signal is also input to the corresponding trigger circuit 34, 36 which returns the flip-flop immediately to the set condition, causing it to then send out a high signal to the transmit interface 46. After the duration of the lock signal, the trigger circuit 34, 36 is ready to repeat its function.

The transmit interface 46 accepts signals from either trigger circuit 34, 36 and drives both the first fiber transmitter 24 and the second optical transmitter 16. It also drives the transmitters in the RS-485 interface 20. There is also a system fault time constant circuit 122 which does not allow continuous deadlock on the system by placing a limit on the amount of time the optical transmitters can be on. It is set for a time period of approximately one second. This is more than enough time for normal communication any baud rate.

The baud rate selector 48 consists of RC circuits 124 and a switch whose outputs control the time period of the one-shot multivibrators 120 in the bit timers 40, 44.

The RS-485 interface 20 has a transceiver port 126 with bias resistors 128 which connects to an RS-485 network 22. Low signals entering from the transmit interface 46 propagate to the RS-485 network 22 when the DE input is high. The DE input is turned off after the bit timer 44 is timed out. This again comes from the lock signal. The driver input signal comes from the output of the transmit interface 46. Since the DE signal may be turned off even though further transmit high levels are desired to be output, the bias resistors 128 take over at this time so that the transmission will appear to be continued as it was intended. The driver is of the type 3695.

When apparatus 10 is in the quiescent state, the RS-485 interface 20 and its associated circuits such as the trigger circuit, trigger interlock and bit timer will function in the same fashion as the previously described circuits. In this case, however, the flow of data will be from the RS-485 interface 20 to the first optical transmitter 24 and second optical transmitter 28. The first and second optical transmitters 24, 28 convert outgoing electrical signals to optical signals and are fed by the transmit interface 46. A reset circuit provides correct power-on states of the flip-flops in the trigger circuits.

Figure 3:
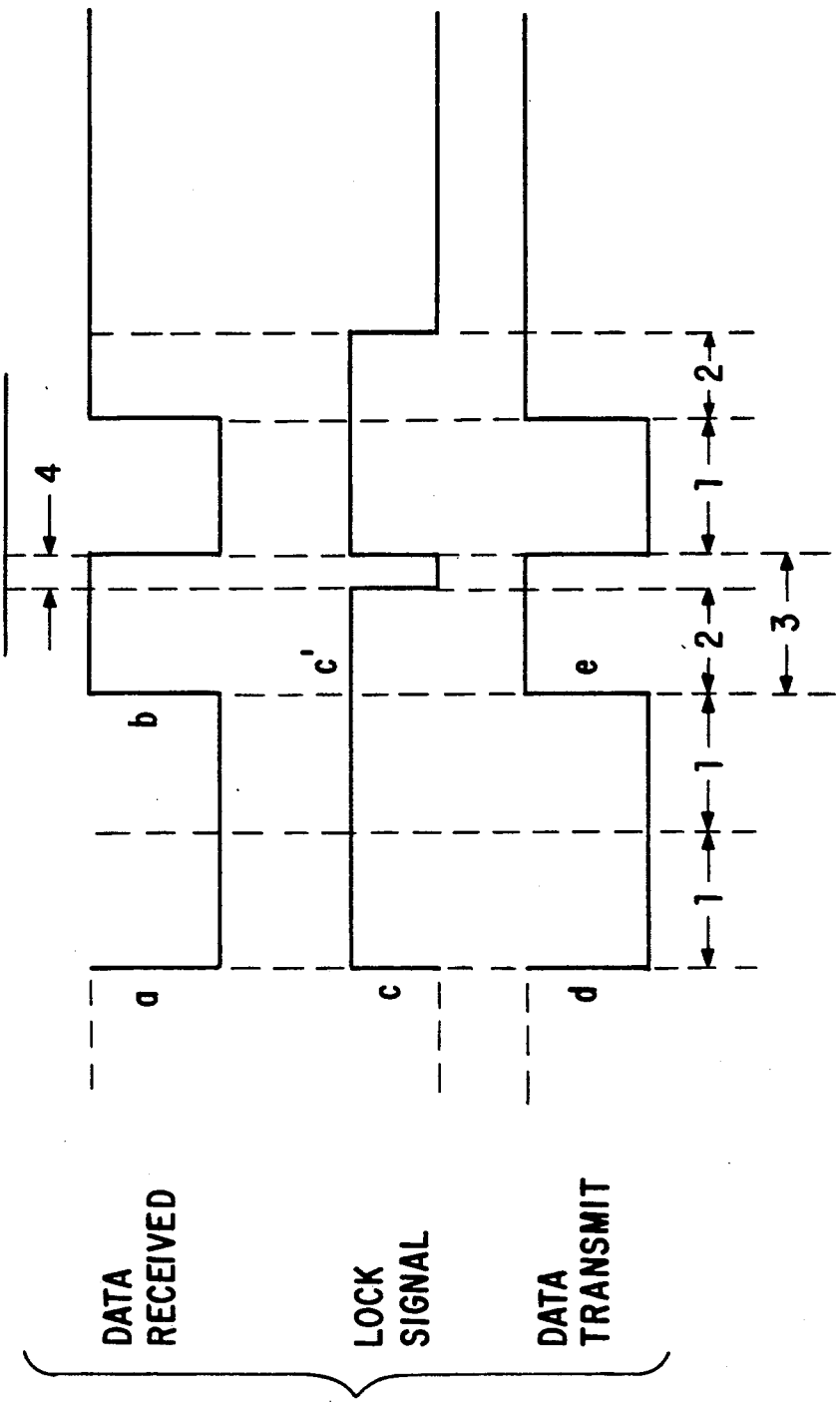
FIG. 3 is a representation of a trigger signal.

FIG. 3 shows a timing signal with respect to data transmitted and data received. Here a high signal equates to a lock signal and a low signal to unlock signal. A 1 represents low signal bit times. A 2 represents the additional lock time (the second state) after a high bit transition. A 3 represents high signal bit times and a 4 represents an unlocked time period for the first and second trigger circuits 34, 36.

At the onset (a) of a low signal, there is caused to be triggered (c) a lock signal and a low signal (d) to be transmitted. At the onset (b) of a high signal, there is caused to be triggered a lock extend signal c' and a high signal e to be transmitted. The lock signal c locks out the other trigger circuit from the first state and the lock extend signal c locks out the other trigger circuit further and resets the corresponding trigger circuit locking it also.

Figure 4:
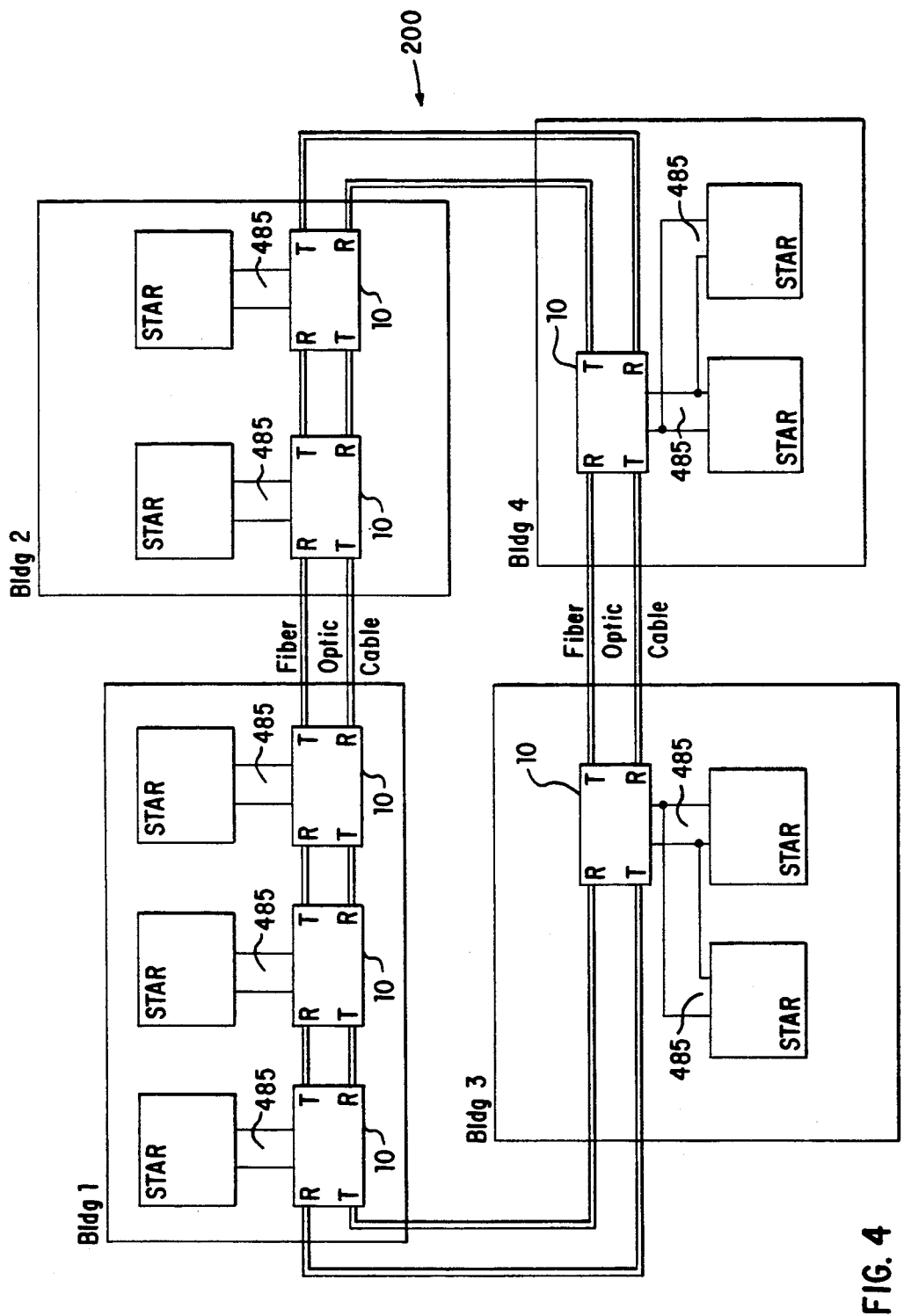
FIG. 4 is a schematic representation of a network formed with the present invention.

FIG. 4 is a schematic representation of a network 200 formed between 4 buildings with the apparatus 10. Each building has a plurality of STAR networks which are linked by the network 200.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus comprising:
   a first optical receiver for receiving optical digital signals from a first optical fiber;
   a second optical receiver for receiving optical digital signals from a second optical fiber;

a half duplex interface which communicates with the first and second optical receivers and to a half duplex line for receiving electrical digital signals from the half duplex line and sending electrical digital signals thereto corresponding to optical digital signals received from either the first or second optical receivers;

a first optical transmitter means for providing optical digital signals to a third optical fiber corresponding to digital signals received by the first or second optical receivers or the interface;

a second optical transmitter means for providing optical digital signals to a fourth optical fiber corresponding to signals received by the first or second optical receivers or the interface;

a receiver data merger connected to the first and second optical receivers for merging the signals therefrom and producing a corresponding signal;

a first trigger circuit in communication with the interface and the first and second optical transmitters for passing signals from the interface to the transmitters when the first trigger circuit is in a first state;

a second trigger circuit in communication with the optical receive data merger and the interface, and the first and second optical transmitter, for passing signals from the receiver data merger to the interface and to the first and second fiber transmitter when the second trigger circuit is in a first state; and means for controlling when the first and second trigger circuits are in the first ate, said controlling means connected to the first and second trigger circuit and preventing the first and second trigger circuit from being in the first state at the same time and for preventing one of the trigger circuits from being in the first state for at least a predetermined period of time corresponding to a number of bits after the other trigger circuit is in the first state.

2. An apparatus as described in claim 1 wherein the controlling means includes a first trigger interlock connected to the first and second trigger circuits for locking out the second trigger circuit from the first state; while the first trigger circuit is in the first state and for a predetermined period of time thereafter;

a first bit timer connected to the first trigger interlock for providing a signal to the first trigger interlock causing the first trigger interlock to unlock the second trigger circuit when the predetermined period of time has passed;

a second trigger interlock connected to the first and second trigger circuits for locking out the first trigger circuit from the first state while the second trigger circuit is in the first state and for a predetermined period of time thereafter; and a second bit timer connected to the second trigger interlock for providing a signal to the second trigger interlock causing the second trigger interlock to unlock the first trigger circuit when the predetermined period of time has passed.

3. An apparatus as described in claim 2 wherein the predetermined period of time corresponds to one bit.

* * * * *